United States Patent [19]

Park

[11] Patent Number: 4,528,300
[45] Date of Patent: Jul. 9, 1985

[54] PROCESS FOR PRODUCING DIMENSIONALLY STABLE POLYOLEFIN FOAMS USING ENVIRONMENTALLY ACCEPTABLE BLOWING AGENT SYSTEMS

[75] Inventor: Chung P. Park, Pickerington, Ohio

[73] Assignee: The Dow Chemical Company, Midland, Mich.

[21] Appl. No.: 575,627

[22] Filed: Jan. 31, 1984

[51] Int. Cl.$^3$ .............................................. C08J 9/14
[52] U.S. Cl. ........................................ 521/79; 264/53; 264/DIG. 5; 521/94; 521/98; 521/134; 521/149; 521/910
[58] Field of Search ............... 521/79, 94, 98, 910; 264/53, DIG. 5

[56] References Cited

U.S. PATENT DOCUMENTS

| | | | |
|---|---|---|---|
| 3,062,729 | 11/1962 | Skochdopole et al. | 204/159.18 |
| 3,327,031 | 6/1967 | Boyer et al. | 264/53 |
| 3,379,802 | 4/1968 | Raley et al. | 264/53 |
| 3,549,470 | 12/1970 | Greenwald et al. | 521/918 |
| 3,639,304 | 2/1972 | Raley, Jr. | 521/140 |
| 3,711,430 | 1/1973 | Rubens | 521/60 |
| 3,766,099 | 10/1973 | Kawai et al. | |
| 3,808,300 | 4/1974 | Miyamoto et al. | 264/53 |
| 3,874,965 | 4/1975 | Greenwald et al. | 521/918 |
| 4,289,857 | 9/1981 | Hoki et al. | 521/79 |
| 4,331,777 | 5/1982 | Hoki et al. | 521/79 |
| 4,345,041 | 8/1982 | Hoki et al. | 521/79 |
| 4,347,329 | 8/1982 | Park | 521/79 |
| 4,368,276 | 1/1983 | Park | 521/79 |
| 4,395,510 | 7/1983 | Park | 521/79 |
| 4,422,877 | 12/1983 | Spitzer et al. | 521/79 |

OTHER PUBLICATIONS

Research Disclosure No. 14623, Jun., 1976.

*Primary Examiner*—Morton Foelak

[57] ABSTRACT

The use in conventional polyolefin extrusion foaming processes of a stability control agent (e.g., stearamide, EAA copolymer, etc.) in conjunction with certain mixed blowing agent systems, the mixed blowing agent system containing 60-95 weight percent of 1-chloro-1,1-difluoroethane or 60-95 weight percent of 1,1-difluoroethane. These compounds have a shorter atmospheric lifetime and lower stability than the saturated chlorofluorocarbons presently used as blowing agents or in blowing agent systems.

20 Claims, No Drawings

PROCESS FOR PRODUCING DIMENSIONALLY STABLE POLYOLEFIN FOAMS USING ENVIRONMENTALLY ACCEPTABLE BLOWING AGENT SYSTEMS

BACKGROUND OF THE INVENTION

It is well known to prepare olefin polymer foams by heat plastifying a normally solid olefin polymer resin, admixing such heat plastified resin with a volatile blowing agent under heat and pressure to form a flowable gel and thereafter extruding the gel into a zone of lower pressure and temperature to expand and cool the gel to form the desired solid olefin foam product.

A problem frequently encountered is that of preventing an unacceptable degree of shrinkage of partially cured foam during the aging or curing period following manufacture. During the "aging" or "curing" period, the blowing agent employed is gradually diffusing out of the cells in the foam product and air is gradually diffusing into the cells in place thereof. For example, U.S. Pat. No. 4,347,329 teaches that a blowing agent such as dichlorodifluoromethane can be used, and that it can be mixed with other stability agents and volatile halogenated hydrocarbons to produce low density (e.g., 1 to 6 pounds per cubic foot) foams of ethylenic polymer resins.

Other existing technology has also developed along these same lines to allow preparation of dimensionally stable foams (e.g., U.S. Pat. No. 3,644,230 and Watanabe et al., U.S. Pat. No. 4,214,054). These techniques, however, limit the maximum cross-section of the foam articles which can be obtained from a given type of extrusion apparatus. Moreover, changes of volatile blowing agents, and mixtures thereof with and without stability control modifiers affect the foam production in a variety of undeterminable ways.

The blowing agents used in the production of these low density foams are generally a high percentage, if not entirely, fluorocarbons. Saturated chlorofluorocarbons are suspected of destroying the earth's protective ozone layer by migrating up through the troposphere to the stratosphere and catalyzing ozone-destroying chain reactions. Because these compounds are so stable, they are able to survive in the troposphere, the troposphere being the layer of the atmosphere extending from Earth's surface to an altitude of 10 to 16 miles. Since the 1950's, rapid advancement in chemical analytical techniques have led to a large amount of knowledge concerning atmospheric composition. It has been found that the need exists for development and use of volatile blowing agent compounds which are less stable and have a shorter half-life in the atmosphere, thereby having the potential for less environmental damage.

This invention accomplishes such an improvement by producing a dimensionally stable ethylenic polymer foam, having adequate plank size, using a blowing agent that is environmentally safe.

SUMMARY OF THE INVENTION

In accordance with the present invention, there is provided such a process for preparing closedcell olefin polymer foam articles having increased maximum achievable cross-sectional areas on a given type or size of extrusion apparatus and having good dimensional stability. Along with these benefits, an expandable olefin polymer composition is produced that is environmentally safer than similar currently produced compositions.

In such process,
(A) a normally solid olefin polymer resin is heat plastified and intimately admixed, under elevated temperature and pressure,
 (1) with a stability control agent, and
 (2) a mixed blowing agent system selected from the group of systems consisting of:
  (a) from about 50 to about 95 weight percent of 1-chloro-1,1-difluoroethane and from about 5 to about 50 weight percent of an aliphatic hydrocarbon composition and/or a halogenated hydrocarbon composition, such aliphatic and/or halogenated hydrocarbon composition(s) having a normal atmospheric boiling point of from about 0° C. to about 50° C., the system having a saturated vapor pressure at 100° C. of less than about 21 kg/cm$^2$ but greater than about 17 kg/cm$^2$; and
  (b) from about 50 to about 95 weight percent of 1,1-difluoroethane and from about 5 to about 50 weight percent of an aliphatic hydrocarbon compound and/or a halogenated hydrocarbon composition, such aliphatic and/or halogenated hydrocarbon composition(s) having a normal atmospheric boiling point of from about 0° C. to about 50° C., the system having a saturated vapor pressure at 100° C. of less than about 32 kg/cm$^2$ but greater than about 24 kg/cm$^2$;
(B) the weight percentages of the components in the mixed blowing agent systems being based on the total weight of the mixed blowing agent system, the resultant mixture then being extruded into a zone of lower pressure and cooled to thereby form an olefin polymer foam.

DETAILED DESCRIPTION OF THE INVENTION

The aforementioned process is particularly well suited for the preparation of closed-cell olefin polymer foamed articles of relatively low density, e.g., from about 1 to about 6 (especially from about 1 to about 3) pounds per cubic foot (pcf) having relatively small or fine cell size and having relatively large cross-sectional area(s) (e.g., cross-sectional areas in excess of about 48 square inches taken in a plane perpendicular to the direction of extrusion of the foamed article involved). In addition, such process is especially advantageous in that it permits the preparation of such articles without excessive shrinkage during the manufacture thereof and/or during the storage thereof in fresh foam. That is, the resulting foamed articles have (in fresh foam form) relatively good dimensional stability in ambient temperatures (e.g., 70° F.); typically shrinking no less than about 80 (preferably no less than about 85 and most preferably no less than about 90) percent of their initial foamed volume under such manufacturing and/or storage condition.

This process also has the additional advantage of using blowing agent mixture(s) that are less stable and have a shorter half-life than those chlorofluorocarbons previously used. While the fluorocarbons used according to the present invention are considered to be environmentally acceptable, it is important to note that not all fluorocarbons produce an acceptable foaming process. It is necessary to use the blowing agent systems based on these fluorocarbons and incorporate a stability control agent to make extrusion foaming easier, environmentally safe and cost effective, while maintaining foam dimensional stability.

Olefin polymer resins suitably used in the practice of the present invention include ethylene homopolymers such as low, medium or high density polyethylene, and ethylene copolymers such as ethylene-vinyl acetate copolymers, ethylene-propylene copolymers, ethylene-1-butene copolymers, ethylene-butadiene copolymers, ethylene-vinyl chloride copolymers, ethylene-methyl methacrylate copolymers, ethylene-acrylonitrile copolymers, ethylene-acrylic acid copolymers and the like. As the olefin polymer resin, it is preferable to use an ethylene homopolymer or a copolymer having an ethylene content above 50 percent by weight, preferably above 75 percent by weight. Naturally, blends of two or more of such olefin polymer resins can also be suitably employed in the practice of the present invention.

Stability control agents suitable for use herein include the long-chain fatty acid/polyol partial esters described in U.S. Pat. No. 3,644,230 as well as higher alkyl amines, fatty acid amides and complete esters of higher fatty acids such as those described in Watanabe et al. U.S. application Ser. No. 952,865, filed Oct. 19, 1978 (now U.S. Pat. No. 4,214,054, issued July 22, 1980) and the teachings of such patents are hereby incorporated by reference thereto. Typically, such stability control additives are employed in an amount ranging from 0.1 to about 10 weight percent based upon the weight of the olefin polymer employed and preferably they are employed at a level of from about 0.5 to about 5 weight percent of such olefin polymer resin. Also included as stability control agents suitable for use herein are an alkyl substituted amide of an unsaturated fatty acid or an alkenyl substituted amide of a saturated fatty acid. Typically, these stability additives are employed in the same amounts (weight percent based upon the weight of base resin) as above, from 0.1 to about 10 weight percent, preferably 0.2 to 5 weight percent. Other suitable stability control agents which can be used in place of or in addition to the foregoing stability control additives include the copolymers of α-olefins with various monoethylenically unsaturated carboxylic acids such as, for example, copolymers of a major portion of ethylene containing copolymerized therewith a minor proportion of a monoethylenically unsaturated carboxylic acid such as acrylic acid, methacrylic acid and the like. (Preferred carboxyl-bearing copolymers for such permeability modification include ethylene-acrylic acid copolymers having from about 3 to about 45, preferably from about 15 to about 45, weight percent of acrylic acid copolymerized therein.) When such carboxyl-containing copolymers are so-used, the amount of their usage is not particularly critical so long as a sufficient amount is employed to impart the desired dimensional stability to the resulting olefin polymer foam product. However, as a general rules: (a) when the carboxyl-containing polymer contains relatively lower proportions of acid monomer (e.g., from 3 to about 15 weight percent based upon such carboxyl polymer) it will typically be employed in relatively larger proportions (e.g., from about 40 to about 90 weight percent of the total polymer solids), and (b) when such carboxyl-polymer contains higher levels of carboxylic acid monomer therein (e.g., from about 15 to about 45 weight percent based upon the carboxyl polymer) then such carboxyl-containing polymer will typically be used in the range of from about 15 to about 40 weight percent of the total polymer solids employed in the extrusion foaming process. Naturally, when the olefin polymer to be foamed itself functions as a stability control agent (e.g., copolymers of ethylene and a monoethylenically unsaturated carboxylic acid such as acrylic acid, etc.), the addition of a further stability control agent as a separate additional ingredient is not necessary since in that event such polymer performs the dual function of being both the polymer to be foamed as well as being its own stability control agent.

As has been noted, an important feature of the present invention is the use as the blowing agent herein of a mixed blowing system which consists essentially of a mixture comprising at least one compound selected from the group consisting of 1-chloro-1,1-difluoroethane (also referred to as FC-142b) and 1,1-difluoroethane (also referred to as FC-152a) and at least one compound selected from the group consisting of aliphatic hydrocarbon compounds and halogenated hydrocarbon compounds, the aliphatic or halogenated hydrocarbon compounds having an atmospheric pressure boiling point of from 0° C. to about 50° C. Further where the mixture consisting of FC-142b and the aliphatic hydrocarbon or halogenated hydrocarbon meets the above requirements, the system must exhibit a saturated vapor pressure at 100° C. of less than about 21 kg/cm$^2$ but greater than about 17 kg/cm$^2$. A system comprising F-152a and an aliphatic hydrocarbon or a halogenated hydrocarbon also meeting the above requirements should exhibit a saturated vapor pressure at 100° C. of less than about 32 kg/cm$^2$ but greater than about 24 kg/cm$^2$. Preferably, in addition to meeting the above requirements, such mixed blowing agent systems (a) contain from about 5 to about 40 (more preferably from about 5 to about 35, most preferably from about 5 to about 25 and especially about 20) weight percent of the indicated 0° C. to 50° C. boiling point aliphatic hydrocarbon and/or halogenated hydrocarbon composition(s) with the remainder of the system being either FC-142b or FC-152a, and (b) the FC-142b-containing system exhibits a saturated vapor pressure at 100° C. of greater than about 17 kg/cm$^2$ but less than about 21 kg/cm$^2$. While the FC-152a-containing system exhibits a saturated vapor pressure at 100° C., less than about 32 kg/cm$^2$ but greater than about 24 kg/cm$^2$.

It is to be noted that such system(s) beneficially provide the use of blowing agents which do not harm the atmosphere where the current use of other agents is harmful to the atmosphere. In addition, such new agents work in combination with other volatile hydrocarbons to the extent that dimensional stability is not sacrificed and a good cross-sectional size is maintained with fine cell size at both ambient and elevated temperatures. It is surprising that these particular fluorocarbons work as well as they do in the manufacture of low density polyethylene foams since the prior art teaches the use of heavily chlorinated/fluorinated methane derivatives and not ethane derivatives with far less fluorides/chlorides on the compounds.

Suitable 0° C. to 50° C. boiling point aliphatic hydrocarbon compounds and halogenated hydrocarbon compounds for use in the aforementioned mixed blowing agent system include n-butane, pentane, trichloromonofluoromethane (FC-11), trichlorotrifluoroethane, dichloromonofluoromethane, ethyl chloride, 1-chloropropane and the like. Preferred 0° C. to 50° C. boiling point compounds for use herein include ethyl chloride.

In practice, the amount of the aforementioned mixed blowing agent system employed in practicing the present invention will vary and will be dictated primarily by the particular foam density sought to be manufactured via such process. However, as a general rule the amount of such mixed blowing agent employed will typically be in the range of from about 0.04 to about 0.4 gram-mole of the combined mixed blowing agent per 100 grams of the olefin polymer resin to be foamed therewith.

In addition to the hereinbefore described ingredients, there may also be employed in the practice of the present invention other ingredients or additives which conventionly find applicability in known extrusion foaming processes such as, for example, known nucleating (or cell-size controlling) agents (e.g., talc, clay, mica, silica, titanium oxide, zinc oxide, calcium silicate, metallic salts of fatty acids, such as barium stearate, zinc stearate, aluminum stearate, etc.), wetting agents, and the like.

The following examples, in which all parts and percentages are on a weight basis unless otherwise indicated, are presented as illustrative of the present invention and are not to be understood as limiting its scope.

Example 1

The apparatus used in this example is a 1¼ inch screw type extruder having additional zones for mixing and cooling at the end of usual sequential zones for feeding, melting and metering. An opening for blowing agent injection is provided on the extruder barrel between metering and mixing zones. At the end of the cooling zone, there is attached a die orifice having an opening of rectangular shape. The height of the opening is adjustable while its width is fixed at 0.25 inch.

Granular polyethylene having a density of 0.921 g/cc and a melt index of 2.3, talcum powder in an amount of 0.7 part by weight per 100 parts by weight of polyethylene, and a stearamide concentrate consisting of 25 percent by weight of Kemamide ® S (trademark of Humko-Sheffield Chemical Company) produced by Humko-Sheffield Chemical Company and 75 percent by weight of polyethylene in an amount sufficient to provide a stearamide level of 1.0 part by weight per 100 parts by weight of total resin are uniformly premixed. A small amount of wetting agent is added to facilitate adhesion of the talcum powder to the polymer granules. The mixture is then fed into the extruder through an opening at one end of the feeding zone at an essentially uniform rate of about 10 pounds per hour. The temperature maintained at the various extruder zones are approximately 140° C. in the feeding zone, 180° C. in the melting and metering zones and 150° C in the mixing zone.

A foaming agent comprising FC-142b and ethyl chloride having a composition shown in Table I was injected into the injection port at a rate shown also in Table I. The temperature of the cooling zone was maintained so as to reduce the temperature of the polymer/blowing agent mixture to a uniform temperature of about 108° C. The foam body with an approximately rectangular cross-section with rounded corners was conducted away from the die opening.

The maximum achievable cross-section of foam body is determined by adjusting the die gap opening and observing the quality of the foam produced at various die gap settings.

At die gap dimensions near those dimensions giving the maximum achievable foam cross-section, foam samples are saved to determine dimensional stability and physical properties of the foam. Dimensional stability at ambient temperature is tested on samples having a length of approximately 8 inches and is determined by observing the minimum volume to which such samples shrink at ambient temperature following their preparation. Foam sample volumes are determined by measuring the volume of water displaced by said foam samples when submerged in water. The results of various runs performed are summarized in Table I.

As seen in Table I, the maximum achievable cross-section increases with the level of ethyl chloride in blowing agent mixture, while foam dimensional stability at both room temperature and high temperature in general deteriorates. Cell size also increases with the level of ethyl chloride making the foam appear coarse. The data shown in Table I indicate that a blowing agent system containing 10 to 30 percent of ethyl chloride provides the best balance between increased foam cross-sectional size and other important properties (e.g., cell size, dimensional stability at both room temperature and 150° F., etc.). Such blowing agent systems have at 100° C. saturated vapor pressures in the range of from about 20.5 to about 17.8 kg/cm$^2$ and thus are representative of especially preferred embodiments of the present invention.

TABLE I

| Test No. | Blowing Agent Type | Ratio (1) | Level (pph) (2) | Maximum Cross-Section (in$^2$) (3) | Foam Thickness (in) (4) | Foam Density (pcf) (5) | Cell Size (mm) (6) | Foam Stability (%) Room Temp. (7) | 150° F. (8) |
|---|---|---|---|---|---|---|---|---|---|
| I.1 | FC-142b | — | 13.4 | 1.10 | 1.09 | 2.16 | 1.25 | 94 | 79 |
| I.2 | FC-142b/EtCl | 90/10 | 12.7 | 1.20 | 1.14 | 2.16 | 1.08 | 95 | 80 |
| I.3 | FC-142b/EtCl | 80/20 | 12.8 | 1.22 | 1.12 | 2.21 | 1.25 | 92 | 81 |
| I.4 | FC-142b/EtCl | 70/30 | 11.2 | 1.48 | 1.23 | 2.16 | 1.62 | 82 | 70 |
| I.5 | FC-142b/EtCl | 60/40 | 11.3 | 1.37 | 1.18 | 2.24 | 1.62 | 78 | ND |
| I.6 | FC-142b/EtCl | 50/50 | 10.4 | 1.85 | 1.30 | 2.28 | 2.03 | 61 | ND |

Notes:
(1) = Weight ratio.
(2) = Parts of blowing agent mixed in per hundred parts of polymer.
(3) = Cross-sectional area of foam body in square inches produced at the critical die gap.
(4) = Thickness of foam body produced at the die gap indicated in (7).
(5) = Density of foam body in pounds per cubic foot measured within about five minutes after extrusion.
(6) = Cell size in horizontal direction determined per ASTM D-3576.
(7) = Minimum volume of foam body during aging at ambient temperature as percentage of initial volume measured within about five minutes after extrusion.
(8) = Volume of foam body as percentage of initial volume after aging foam samples at ambient temperature for approximately two weeks and then in an oven maintained at 150° F. for 24 hours.
ND = Not Determined.

Example 2

The same extrusion apparatus used in Example 1 is employed in this example. A polyethylene having a density of 0.921 g/cc and a melt index of 2.0 is employed as the feedstock. Talcum powder is mixed in at 2.0 parts by weight per 100 parts by weight of polyethylene throughout the tests of this example. The stearamide concentrate was mixed in so that the level of stearamide became 5 parts per 100 parts by weight of total polyethylene. The operating procedure of the extrusion line in this example was essentially the same as in Example 1.

The data in Table II show that except for a slightly improved foam dimensional stability, other properties follow a similar trend as in Example 1.

Again, from both processability and foam dimensional stability standpoints, an optimum blowing agent is one containing about 10 to 30 parts by weight of ethyl chloride in a mixture with FC-142b. Note that even at this high level of stearamide (5 pph) a mixture comprising a 40 percent of higher level of ethyl chloride displays unacceptable dimensional stability. Tests No. II.1, II.5 and II.6 do not represent examples of the present invention.

TABLE II

| | Blowing Agent | | | Maximum Cross-Section (in²) | Foam Thickness (in) | Foam Density (pcf) | Cell Size (mm) | Foam Stability (%) | |
|---|---|---|---|---|---|---|---|---|---|
| Test No. | Type | Ratio (1) | Level (pph) (2) | (3) | (4) | (5) | (6) | Room Temp. (7) | 150° F. (8) |
| II.1 | FC-142b | — | 13.4 | 1.08 | 1.05 | 2.11 | 1.01 | 92 | 93 |
| II.2 | FC-142b/EtCl | 90/10 | 12.8 | 1.18 | 1.15 | 2.20 | 1.35 | 97 | 97 |
| II.3 | FC-142b/EtCl | 80/20 | 11.8 | 1.19 | 1.15 | 2.20 | 1.25 | 96 | 92 |
| II.4 | FC-142b/EtCl | 70/30 | 11.7 | 1.48 | 1.20 | 2.17 | 1.62 | 91 | 85 |
| II.5 | FC-142b/EtCl | 60/40 | 10.9 | 1.40 | 1.19 | 2.09 | 1.47 | 80 | 66 |
| II.6 | FC-142b/EtCl | 50/50 | 11.1 | 1.50 | 1.31 | 2.19 | 1.31 | 78 | 67 |

Notes:
Same as Table I.

Example 3

The same apparatus and operating procedures were employed in this example as in Example 1. Blowing agents used in the tests of this example are FC-152a and its mixtures with ethyl chloride. There were employed 0.7 part of talc and 2.0 parts of stearamide per 100 parts of polymer in the tests of this example. Compositions and test results are shown in Table III.

In Test III.1, FC-152a produced a very small cross-sectioned foam with an unacceptably fine cell size. As the results of Test III.3 indicate, a 50/50 mixture of FC-152a/ethyl chloride has poor dimensional stability. Test III.2 shows that a 75/25 mixture of FC-152a/ethyl chloride results in an adequate foam cross-section and acceptable, though marginal, dimensional stability.

The data shown in Table III indicate that a blowing agent system containing 10 to 25 percent of ethyl chloride provides the best balance between increased foam cross-sectional size and other important properties (e.g., cell size, dimensional stability at both room temperature and 150° F., etc.). Such blowing agent systems have at 100° C. saturated vapor pressures in the range of from about 30 to about 25 kg/cm² and thus are representative of especially preferred embodiments of the present invention.

TABLE III

| | Blowing Agent | | | Maximum Cross-Section (in²) | Foam Thickness (in) | Foam Density (pcf) | Cell Size (mm) | Foam Stability (%) | |
|---|---|---|---|---|---|---|---|---|---|
| Test No. | Type | Ratio (1) | Level (pph) (2) | (3) | (4) | (5) | (6) | Room Temp. (7) | 150° F. (8) |
| III.1 | FC-152a | — | 8.6 | 0.63 | 0.70 | 2.23 | 0.52 | 99 | ND |
| III.2 | FC-152a/EtCl | 75/25 | 8.8 | 1.14 | 1.04 | 2.24 | 1.62 | 81 | 69 |
| III.3 | FC-152a/EtCl | 50/50 | 10.1 | 1.70 | 1.32 | 2.27 | 2.31 | 69 | ND |

Notes:
Same as Table I.

While the present invention has been herein described with reference to particular illustrative examples and embodiments thereof, such particulars are not to be understood as further limiting the instantly claimed invention.

What is claimed is:

1. A process for preparing closed-cell olefin polymer foamed articles having increased maximum achievable cross-sectional areas and having good dimensional stability which process comprises the steps of:
   (A) heat plastifying a normally solid olefin polymer resin;
   (B) admixing said heat plastified resin under elevated temperature and pressure with
      (1) a stability control agent and
      (2) a mixed blowing agent system selected from the group consisting of
         (a) from about 50 to about 95 weight percent of 1-chloro-1,1-difluoroethane and from about 5 to about 50 weight percent of an aliphatic hydrocarbon composition and/or a halogenated hydrocarbon composition, such composition(s) having a normal atmospheric boiling point of from about 0° C. to about 50° C., the system having a saturated vapor pressure at 100° C. of less than about 21 kg/cm² but greater than about 17kg/cm²; and
         (b) from about 50 to about 95 weight percent of 1,1-difluoroethane and from about 5 to about 50 weight percent of an aliphatic hydrocarbon composition and/or halogenated hydrocarbon compositions, such aliphatic and/or halogenated hydrocarbon composition(s) having a normal atmospheric boiling point of from about 0° C. to about 50° C., the system having a saturated vapor pressure at 100° C. of less than about 32 kg/cm² but greater than about 24 kg/cm²;

the weight percentages of the components in the mixed blowing agent systems being based on the total weight of the mixed blowing agent system, (C) extruding the resultant resin, stability control agent and blowing agent mixture into a zone of lower pressure; and (D) cooling the mixture to thereby form an olefin polymer foam.

2. The process of claim 1 wherein the resultant resin, stability control agent and blowing agent mixture is extruded into a zone of lower temperature and pressure.

3. The process of claim 1 wherein the mixed blowing agent system consists essentially of from about 5 to about 40 weight percent of said aliphatic hydrocarbon and/or halogenated hydrocarbon composition(s) and from about 60 to about 95 weight percent of 1-chloro-1,1-difluoroethane or 1,1-difluoroethane.

4. The process of claim 1 wherein the olefin polymer is a homopolymer of ethylene, a copolymer thereof with up to about 50 weight percent of vinyl acetate, propylene, butene-1, butadiene, vinyl chloride, methyl methacrylate, or acrylonitrile or a copolymer of ethylene with up to about 50 weight percent of acrylic acid.

5. The process of claim 1 wherein the olefin polymer is polyethylene.

6. The process of claim 1 wherein the stability control agent is stearamide.

7. The process of claim 1 wherein the aliphatic hydrocarbon component of the mixed blowing agent system is ethyl chloride or trichloromonofluoromethane.

8. The process of claim 1 wherein the aliphatic hydrocarbon component of the mixed blowing agent is trichloromonofluoromethane.

9. The process of claim 1 wherein the aliphatic hydrocarbon component of the mixed blowing agent is ethyl chloride.

10. The process of claim 1 wherein the mixed blowing agent system is system (a).

11. The process of claim 1 wherein the mixed blowing agent system is system (b).

12. The process of claim 1 wherein the mixed blowing agent system consists essentially of from about 5 to about 25 weight percent of said aliphatic hydrocarbon and/or halogenated hydrocarbon composition(s) and from about 75 to about 95 weight percent of one compound selected from the group consisting of 1-chloro-1,1-difluoroethane and 1,1-difluoroethane.

13. The process of claim 1 wherein the stability control agent is stearamide and is employed in an amount of from about 0.1 to about 10 weight percent based upon the olefin polymer weight.

14. The process of claim 1 wherein the olefin foam produced has a density of from about 1 to about 6 pounds per cubic foot.

15. The process of claim 1 wherein the mixed blowing agent is employed in an amount of from about 0.04 to about 0.4 gram-moles per 100 grams olefin polymer.

16. The process of claim 1 wherein the foam produced thereby does not shrink to less than about 80 percent of its initial volume at ambient temperature at any point during the manufacture thereof.

17. The process of claim 1 wherein the foam produced thereby does not shrink to less than about 85 percent of its initial volume at ambient temperature at any point during the manufacture thereof.

18. The process of claim 1 wherein the foam produced thereby has a cross-sectional area of greater than about 48 square inches taken in a plane perpendicular to the direction of extrusion.

19. The process of claim 1 wherein the stability control agent is one or more compounds selected from the group consisting of saturated higher fatty acid amides, higher alkyl amines, complete esters of polyhydric alcohols with saturated higher fatty acids, alkyl substituted amides of unsaturated fatty acids, and alkenyl substituted amides of saturated fatty acids.

20. The process of claim 1 wherein the stability control agent is a saturated higher fatty acid amide.

* * * * *